INVENTORS
Minoru Ohya
Sumio Uozumi

William C. Parnell
ATTORNEY

United States Patent Office 3,425,300
Patented Feb. 4, 1969

3,425,300
SPEED CHANGE GEARING DEVICES
Minoru Ohya and Sumio Uozumi, Toyota-shi, Japan, assignors to Toyota Motor Co., Ltd., Aichi-ken, Japan, a corporation of Japan
Filed July 5, 1966, Ser. No. 562,735
Claims priority, application Japan, July 5, 1965, 40/40,257
U.S. Cl. 74—763         12 Claims
Int. Cl. F16h 57/10

ABSTRACT OF THE DISCLOSURE

A transmission apparatus for providing three forward speeds, a neutral and a reverse is provided with a minimum of operating elements so as to reduce bulk and weight, and with only external gears thereby eliminating the need for costly internal gearing. The basic structure includes at least one planetary gear system mounted in a carrier to be driven by two clutched sun gears, one through an idler gear, and a gear driven by a planetary pinion.

---

This invention relates to speed change gearing devices and, more particularly, to three-speed change mechanisms especially adapted for use as fluid type automatic transmissions in vehicles.

The main object of the present invention is to reduce the bulk and cost and improve the operation of such mechanisms.

Conventional fluid type automatic speed change mechanisms for vehicles using planetary gears are generally of only two stages, with the result that their efficiency and accelerating power are relatively low and they produce excessive noise and vibration because the engine must be driven at high speed in low gear. When such conventional automatic speed-change devices are used, shock or jarring caused by the sudden changes of engine speed is apt to occur, and to avoid such drawbacks, it is very advantageous to employ a three-stage system. In fact, three-stage systems have heretofore been proposed, and among them are the well-known Borg Warner and Simpson systems, which are commercially used, but in all of them, specific combinations of gears are used.

According to the present invention, a specific gearing combination completely different from the conventional combination of gears has been developed, and the present speed change device is composed of a clutch device, a braking device, and a one-way braking device or the like which connects respective elements to and disconnects them from in-put and out-put shafts or fixed members.

The above and other objects and advantages of the invention will be more clearly understood from the following explanation in conjunction with the embodiments shown in the drawings, in which.

Figure 1:
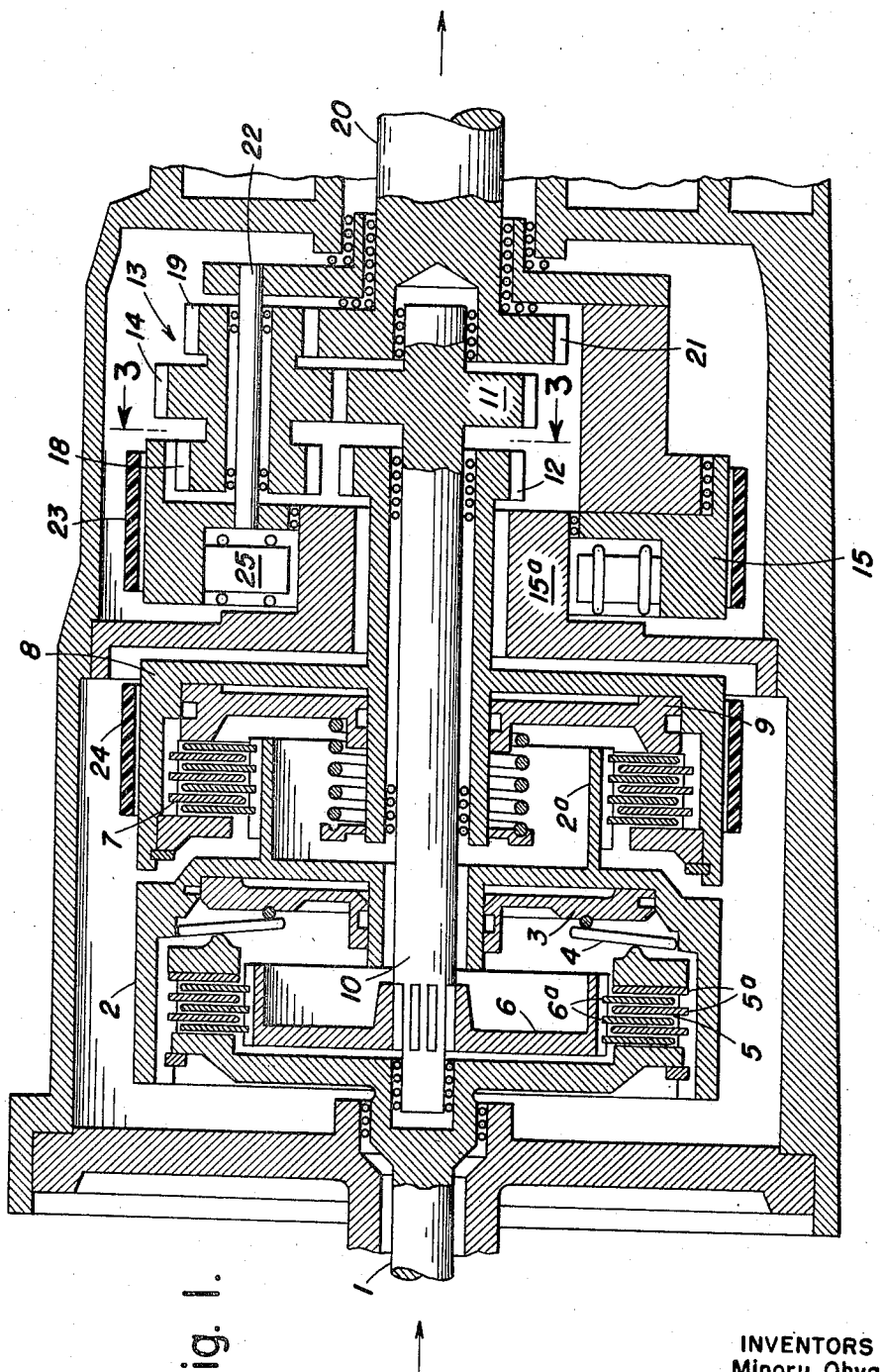
FIG. 1 is a vertical elevation, in section, of an embodiment of planetary gear device of the present invention.

The in-put shaft 1 is connected to the engine, optionally through a clutch mechanism, such as a torque converter or fluid type joint (not shown), and it is splined to a drum 2 to transmit the driving force to the speed change or transmission mechanism. Drum 2 always rotates with shaft 1. Within drum 2, there is a multi-plate front clutch 5, which is engaged and released through a back-spring 4 by a piston 3 movable by oil pressure in the well-known manner. The drive plates 5a of the front clutch 5 are splined to drum 2 for rotation therewith. The clutch disks 6a are splined to hub 6 by a spline in its periphery; lastly, the hub 6 is splined to the intermediate shaft 10. Thus, when clutch 5 is engaged, power is transmitted from shaft 1 through drum 2, plates 5a, disks 6a, and hub 6 to shaft 10. Front clutch drum 2 also has a rearwardly extending cylindrical projection 2a, to which the clutch disks of the rear, multi-plate clutch 7 are splined so as to rotate as a unit. The driven clutch plates of the rear clutch 7 are splined to the rear clutch drum 8, and this clutch is operated by a piston 9, in the same manner as piston 3 operates clutch 5. Thus, when clutch 5 is engaged, shaft 10 is rotated, and when clutch 7 is engaged, drum 8 is rotated. If neither clutch is engaged, the mechanism is in "neutral."

Figure 3:
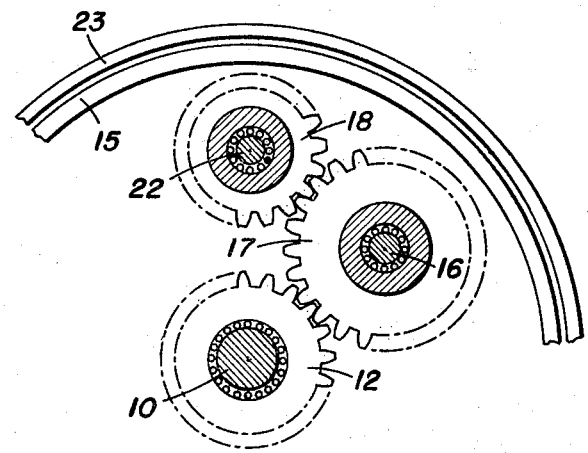
FIG. 3 is a partial cross sectional view taken along the line III—III of FIG. 1, showing the relation of the idler gears not shown in FIG. 1.

The intermediate shaft 10, which is splined to the hub 6 of the front clutch 5, has the in-put sun gear 11 integrally mounted at the rear end thereof. Shaft 10 is supported at either end by shafts 1 and 20. The rear clutch drum 8 is locked or otherwise attached to the reverse shaft and sun gear 12 for rotation therewith. This gear is coaxially journaled around shaft 10. The in-put sun gear 11 is in mesh with the gear 14 in pinions 13 arranged with an appropriate number (such as two or three) (one in the drawing) on the periphery of the sun gear 11. As seen in FIG. 3, the reverse sun gear 12 is in mesh with the idler gear 17 rotatably fitted to a pin 16 which is mounted in the carrier 15, and idler gear 17 is in mesh with the gear 18 of the pinion 13.

The gear 19 located at the rear end of the pinion 13 is in mesh with the gear 21 of the out-put shaft 20. Pinion 13, having the gears 18, 14, and 19 mounted for rotation about a common axis, is rotatably supported on the carrier 15 by a pinion pin 22, and the pinion 17 (the idler gear), as mentioned above, is supported on the carrier 15 by a pinion pin 16. The carrier 15 has a band 23 (or other braking device) for controlling, as shown in the drawing, the carrier 15 either to keep stationary or to release it by operating or releasing the said band 23. At its inner periphery, carrier 15 is independently supported for rotation on stationary shoulder 15a. In the same manner, the band 24 is provided on the outer periphery of the rear clutch drum 8 (hereinafter this is called the front band), and by means of the operation or release of the band, the drum 8 and the reverse sun gear 12 are fixed or freed. Obviously, simultaneous engagement of clutch 7 and band 24 will be avoided at all times.

The one-way brake 25 mounted in the carrier 15 and pressing, when engaged, shoulder 15a, has the same function as the rear band 23 in the low gear state as described hereinbelow.

Figure 2:
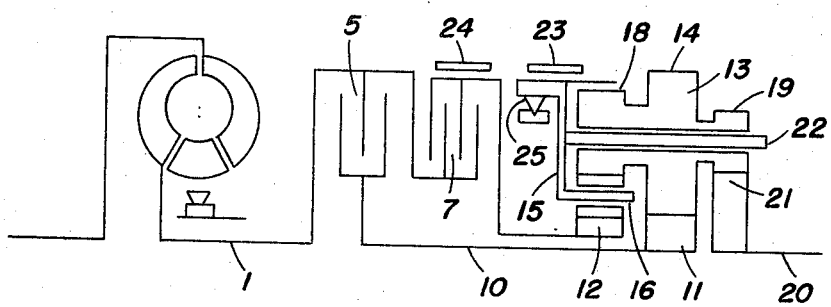
FIG. 2 is a schematic dragram showing the structure thereof.

The operative elements of FIG. 1 are shown schematically in FIG. 2. In FIG. 5 to FIG. 8, the thick lines represent the rotation transmitting elements, while the diagonally shaded portions are stationary, fixed portions; the mark ⊙ shows the direction of movement upward from the surface of paper; and the mark ⊕ shows the opposite or downward directional movement.

In the low gear state (FIG. 5), the front clutch 5 and the rear brake band 23 are engaged. Alternatively, band 23 can be replaced by one-way brake 25. The one-way brake 25 has the same effect as band 23, however, in this case the power from the out-put shaft is not transmitted. With this arrangement, the rotation of the in-put shaft 1 is directly transmitted through the front clutch 5 to shaft 10 and in-put sun gear 11. By means of band 23 or brake 25, the carrier 15 is fixed, and therefore the pinion pin 22 is also fixed, and the in-put rotation is transmitted from the gear 11 through the gear 14 to the gear 19, thence to gear 21 on shaft 20. Gear 18 will drive gears 17 and 12, which are free to rotate without restraint. The speed reducing ratio in the low gear is represented by the formula:

$$i_1 = n_1/n_2 = (Z_{21} \cdot Z_{14})/(Z_{11} \cdot Z_{19})$$

wherein $n_1$ stands for the rotation of the in-put shaft 1; $n_2$ is the rotation of the out-put shaft 20; the numbers of the teeth of the gears 11, 14, 19 and 21, respectively, being represented by $Z_{11}$, $Z_{14}$, $Z_{19}$ and $Z_{21}$.

Next, as to the speed in the second gear (FIG. 6), the front clutch 5 is left engaged, the rear band 23 is released, and the front band 24 is engaged.

Thus, in-put shaft 1 and in-put sun gear 11 are rotated as a unit, and the brake band 24 holds clutch drum 8 and reverse sun gear 12 stationary. Carrier 15 is free to rotate. In this state, the rotation of the in-put shaft 1 is directly transmitted to sun gear 11, and pinions 13 are rotated in the opposite or counter-clockwise direction against the clockwise direction of rotation of the in-put shaft. This movement of pinions 13 tends to rotate the gears 17 in the clockwise direction, but since the gear 12, which is in mesh with the gear 17 is fixed, the pinion pin 16 and carriage 15 revolve around shaft 10 in the clockwise direction. This revolution of the pinion pin 16 is added to the in-put to the sun gear 11, which now is connected to the in-put shaft 1 at the out-put shaft gear 21. Since the number of teeth $Z_{14}$ of the gear 14 is larger than the number of teeth $Z_{19}$ of the gear 19, by this addition it becomes greater than the in-put shaft side, and the rotation of the shaft 10 effectively becomes higher than the rotation of the out-put shaft 20. In other words, the speed is reduced, but not as much as in low gear. The speed reducing ratio $i_2$ in second gear is obtained by the following formula:

$$i_2 = n_1/n_2 = \left(1 + \frac{z_{12} \cdot z_{14}}{z_{11} \cdot z_{18}}\right) / \left(1 + \frac{z_{12} \cdot z_{19}}{z_{21} \cdot z_{18}}\right)$$

(in the above formula, the respective gears are of the same module).

As explained above, it is necessary for the reducing gears to have the relations $Z_{14} > Z_{19}$, $Z_{21} > Z_{11}$ (however, in case modules are different, it is $R_{14} > R_{19}$, $R_{21} > R_{11}$, wherein R stands for pitch circle radius).

The third speed, i.e., the high gear (FIG. 7), is effected by engaging both the front and rear clutches, in which case the in-put sun gear 11 and the reverse sun gear 12 are rotated together; the respective elements of the planetary gears cannot separately make any relative movement; and the planetary gear system rotates as a single body, and therefore the out-put shaft 20 makes the same rotation as the in-put shaft. In essence, sun gear 11 is trying to rotate pinions 13 in one direction and sun gear 12 is trying to rotate pinions 13 in the opposite direction; the net effect is to lock carrier 15 and pinion 13 to the main shaft 10 for rotation therewith. Gear 19 is similarly locked to gear 21 and rotates it. Therefore, in this case, the speed reducing ratio becomes unity.

In order to obtain the reverse operation (FIG. 8), both the rear clutch 7 and the rear brake band 23 are operated, and by so doing the carrier 15, pinion 16 and pinion 22 are fixed, and the rotation of the in-put shaft 1 is transmitted to the reverse sun gear 12 through the rear clutch 7, and in turn is transmitted to the gear 21 of the out-put shaft through the pinion 17 and the pinion 18, and the out-put shaft 20 is rotated reversely. In this case, gear 14 will drive sun gear 11 and shaft 10, which are free to rotate without restraint.

The speed reducing ratio $i_r$ in reverse is obtained by the formula:

$$i_r = (Z_{21} \cdot Z_{18})/(Z_{12} \cdot Z_{19})$$

Thus, it is possible to obtain a speed change device of three-speed forward and one-reverse speed by means of the planetary gears of the present invention, two sets of multi-plate clutches, and two sets of brake bands.

The above-described functions are summarized in the table below:

| Range | State | |
|---|---|---|
| | On (operation) elements | Off (release) elements |
| Low gear | Front clutch 5 and rear brake band 23 or one-way brake 25. | Rear clutch 7, front brake band 24. |
| Second gear | Front clutch 5, front brake band 24. | Rear clutch 7, rear brake band 23. |
| High gear | Front clutch 5, rear clutch 7. | Front brake band 24, rear brake band 23. |
| Reverse gear | Rear clutch 7, rear brake band 23. | Front clutch 5, front brake band 24. |
| Neutral | | Front clutch 5, rear clutch 7. |

The following relations for the number of teeth can be given: $Z_{14} > Z_{19}$, $Z_{21} > Z_{11}$.

And, in view of the structure described, the following relations also hold: $(Z_{12} + Z_{18}) < (Z_{11} + Z_{14})$.

Figure 4:
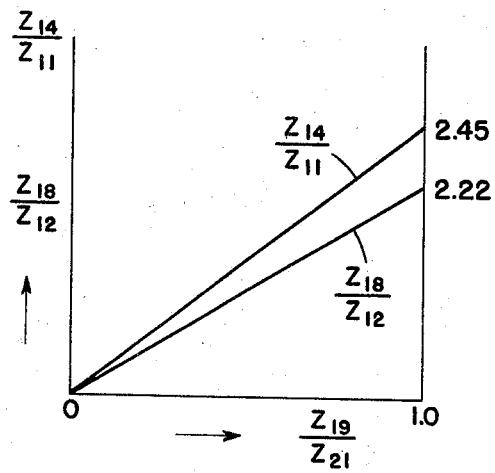
FIG. 4 is a diagram showing an example of figurative values in selecting the number of teeth of the gears.
Figure 5:
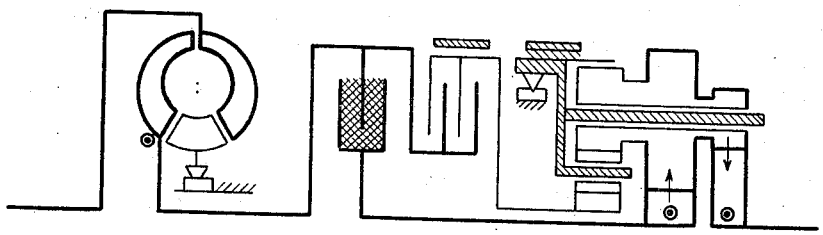
FIG. 5 to FIG. 8 are schematic diagrams showing the mechanism in low gear, second gear, third gear, and reverse gear, respectively.
Figure 6:
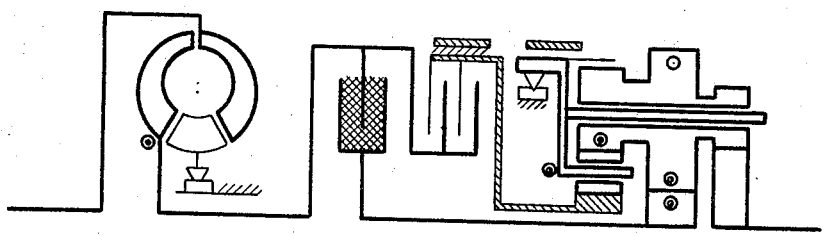
Figure 7:
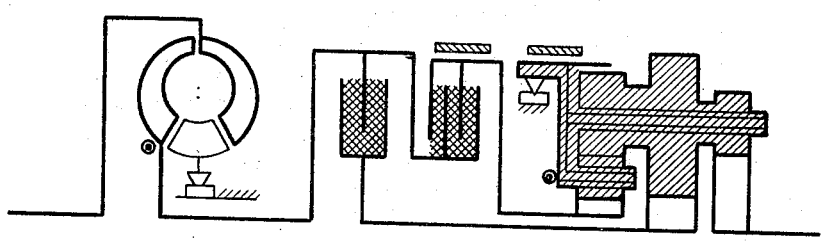
Figure 8:
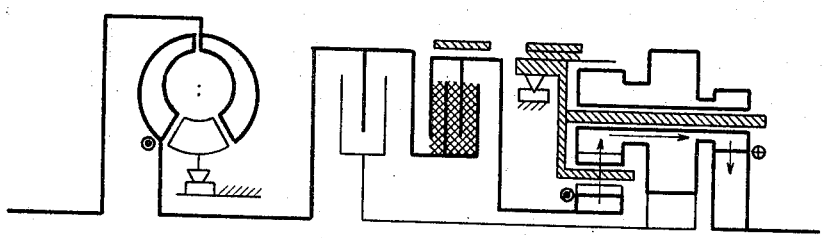

The specific relation of the number of the teeth of the sun-and-planet device of the present invention which imparts the speed reducing ratios such as $i_1 = 2.45$, $i_2 = 1.45$, $i_r = 2.22$, is indicated as shown in FIG. 4. When a value of $Z_{19}/Z_{21}$ is suitably selected, values of $Z_{18}/Z_{11}$ may be determined from FIG. 4.

It is apparent from FIG. 4 that when the speed change device of the present invention is used for an automobile, an appropriate speed reducing ratio can be easily obtained.

Understanding of the invention will be facilitated by specifying arbitrary numbers of teeth for the various gears, following the above relations, and working out the reduction ratios. From FIG. 1, it can be seen that gear 21 is the largest, gear 19 is the smallest, gears 11 and 14 are of intermediate size with gear 11 the larger, gear 12 is about the same size as gear 14, and gear 18 is somewhat larger than gear 19. Within these limits, the following arbitrary numbers can be assigned:

$$Z_{19} = 20$$
$$Z_{18} = 25$$
$$Z_{12} = 30$$
$$Z_{14} = 30$$
$$Z_{11} = 40$$
$$Z_{21} = 60$$

For these values, the reduction ratio for low gear is as follows:

$$i_1 = \left(\frac{60 \cdot 30}{40 \cdot 20}\right) = 2.25$$

For second gear, the reduction is much less:

$$i_2 = \frac{\left(1 + \frac{30 \cdot 30}{40 \cdot 25}\right)}{\left(1 + \frac{30 \cdot 20}{60 \cdot 25}\right)} = 1.36$$

As noted above, high gear has a ratio of unity. For reverse gear, the reduction ratio is as follows:

$$i_r = \frac{60 \cdot 25}{30 \cdot 20} = 2.5$$

The present invention is, as mentioned above, an auxiliary speed-reducing gear device, for automatic speed change, wherein the planetary system is made entirely of outer-toothed or external gears, and therefore the cost of the production of the present speed reducing gear device is much less than the conventional inner-toothed gears because the latter-type gear is difficult and expensive to produce. At the same time, it is possible to have the whole diameter smaller because inner-toothed gears are not used, and furthermore, according to the present invention, it is easy to obtain an appropriate reducing ratio as the automatic transmission or speed change device for automobiles.

Various changes in the details, steps, materials and arrangements of parts, which have been herein described and illustrated in order to explain the nature of the invention, may be made by those skilled in the art within the principle and scope of the invention as defined in the appended claims. Such changes could include, by way of example, substitution of entirely different clutch mechanisms or engaging devices for clutches 5 and 7.

What is claimed is:

1. A geared, three-stage speed changing device comprising:
    rotatable in-put means;
    first rotatable intermediate shaft means engageable to and disengageable from said in-put means by first engaging means;
    second rotatable intermediate shaft means engageable to said in-put means by second engaging means;
    first and second sun gear means axially attached to said first and second rotatable intermediate shaft means for respective rotation therewith;
    at least one pinion gear means engaging said first sun gear means, said pinion gear means consisting of,
    a first gear engaging said first sun gear means, and second and third gears fixedly attached to said first gear for rotation about a common axis;
    at least one idler gear means engaging said second gear and said second sun gear means;
    out-put gear means engaging said third gear;
    out-put means engaging said out-put gear means for rotation therewith;
    independently supported rotatable carrier means adapted for rotation about the axis of said first intermediate shaft means, said carrier means including shaft means for rotation of said pinion gear means and said idler gear means about their respective axes;
    means capable of maintaining said carrier means in a fixed position; and
    means capable of maintaining said second intermediate shaft means in a fixed position.

2. The device as claimed in claim 1, wherein said second intermediate shaft means is coaxial to and rotatable about said first intermediate shaft means.

3. The device as claimed in claim 2, wherein said input means, first intermediate shaft means and out-put means have a common central axis of rotation.

4. The device as claimed in claim 1, wherein said input means comprises a shaft and a fixedly attached first drum, said first engaging means comprises a first clutch, and said first intermediate shaft means comprises a shaft and a fixedly attached hub, said first clutch acting to engage and disengage said first drum and said hub.

5. The device as claimed in claim 4, wherein said second intermediate shaft means comprises a hollow shaft coaxial to and rotatable about said intermediate shaft means and a second drum fixedly attached thereto for rotation about a common axis, and said second engaging means comprises a second clutch, said second clutch acting to engage and disengage said second drum and said first drum.

6. A transmission having low, intermediate and high forward gears, a reverse gear and a neutral position, and adapted for connection between an in-put shaft and an output shaft said transmission comprising:
    (a) first rotatable drum means connectable to said input shaft for rotation therewith about a common axis;
    (b) first rotatable intermediate shaft means engageable and disengageable to said first drum means through first clutch means;
    (c) second rotatable intermediate shaft means coaxial to and rotatable about said first intermediate shaft means;
    (d) second rotatable drum means fixedly attached to said second intermediate shaft means for rotation therewith about a common axis;
    (e) second clutch means acting to engage and disengage said first and second drum means;
    (f) first and second sun gear means axially attached to said first and second shaft means for respective rotation therewith;
    (g) at least one pinion gear means engaging said first sun gear means, said pinion gear means consisting of,
    a first gear engaging said first sun gear means, and second and third gears fixedly attached to said first gear for rotation about a common axis;
    (h) at least one idler gear means engaging said second gear and said second sun gear means;
    (i) out-put gear means fixedly attached to said output shaft for rotation about a common axis and engaging said third gear;
    (j) independently supported rotatable carrier means adapted for rotation about the axis of said first intermediate shaft means, said carrier means including shafts for rotation of said pinion gear means and said idler gear means about their respective axes;
    (k) band means spaced from the periphery of said second rotatable drum and adjustable into contact therewith for maintaining said second drum in a fixed position;
    (l) brake means spaced from said carrier means around the periphery thereof and adjustable into contact therewith for maintaining said carrier means in a fixed position;
    (m) said first gear having more teeth than said third gear;
    (n) said out-put gear having more teeth than said first sun gear;
    (o) said low gear being defined by engagement of said first clutch means (b) and said brake means (l) and disengagement of said second clutch means (e) and said band means (k);
    (p) said intermediate gear being defined by engagement of said first clutch means (b) and said band means (k) and disengagement of said second clutch means (e) and said brake means (l);
    (q) said high gear being defined by engagement of both said clutch means (b and e) and disengagement of band means (k) and brake means (l);
    (r) said reverse gear being defined by engagement of said second clutch means (e) and said brake means (l) and disengagement of said first clutch means (b) and said band means (k); and
    (s) said neutral position being defined by disengagement of both of said clutch means (b and e).

7. The transmission as claimed in claim 6, wherein the number of teeth on said first sun gear and said first gear exceeds the number of teeth on said second sun gear and said second gear.

8. The transmission as claimed in claim 6, wherein said in-put and out-put shafts and said first intermediate shaft means have a common central axis of rotation.

9. The transmission as claimed in claim 6, wherein a plurality of said pinion gear means and said idler gear means are provided.

10. The transmission as claimed in claim 6 wherein said brake means (l) comprise an adjustable band around the periphery of said carrier means.

11. The transmission as claimed in claim 6, wherein said brake means (l) comprise a one-way brake adjustable to engage and disengage said carrier means and said independent support.

12. The transmission as claimed in claim 6, wherein said first intermediate shaft supports said second intermediate shaft, and is supported by said in-put and out-put shafts.

(References on following page)

References Cited

UNITED STATES PATENTS

| | | | |
|---|---|---|---|
| 2,355,427 | 8/1944 | Duffield | 74—759 X |
| 2,600,592 | 6/1952 | Watson | 74—688 |
| 2,745,296 | 5/1956 | Seybold | 74—677 |
| 2,856,796 | 10/1958 | Miller | 74—763 |
| 2,953,946 | 9/1960 | Simpson | 74—762 |
| 3,299,746 | 1/1967 | Konrad | 74—758 |
| 3,339,431 | 9/1967 | Croswhite et al. | 74—763 X |

FOREIGN PATENTS

| | | |
|---|---|---|
| 10,125 | 5/1908 | Great Britain. |

FRED C. MATTERN, JR., *Primary Examiner.*

T. HAMPSHIRE, *Assistant Examiner.*

UNITED STATES PATENT OFFICE
CERTIFICATE OF CORRECTION

Patent No. 3,425,300                                February 4, 1969

Minoru Ohya et al.

It is certified that error appears in the above identified patent and that said Letters Patent are hereby corrected as shown below:

Column 5, line 55, "and said" should read -- said first --.

Signed and sealed this 17th day of March 1970.

(SEAL)
Attest:

Edward M. Fletcher, Jr.                              WILLIAM E. SCHUYLER, JR.
Attesting Officer                                                  Commissioner of Patents